United States Patent
Andersen et al.

(10) Patent No.: US 12,281,973 B2
(45) Date of Patent: Apr. 22, 2025

(54) METHOD OF DETERMINING AT LEAST ONE PROPERTY ASSOCIATED TO A DRY PARTICULATE SUBSTANCE

(71) Applicant: ParticleTech ApS, Farum (DK)

(72) Inventors: Trine Aabo Andersen, Farum (DK); Tom Olesen, Farum (DK); Rasmus Fjordbak Nielsen, Farum (DK)

(73) Assignee: ParticleTech ApS, Farum (DK)

( * ) Notice: Subject to any disclaimer, the term of this patent is extended or adjusted under 35 U.S.C. 154(b) by 0 days.

(21) Appl. No.: 18/776,431

(22) Filed: Jul. 18, 2024

(65) Prior Publication Data
US 2025/0027865 A1   Jan. 23, 2025

(30) Foreign Application Priority Data
Jul. 20, 2023   (DK) .......................... PA 2023 70385

(51) Int. Cl.
*G01N 15/0227* (2024.01)
*G01N 15/00* (2006.01)

(52) U.S. Cl.
CPC . *G01N 15/0227* (2013.01); *G01N 2015/0053* (2013.01); *G01N 2015/03* (2013.01)

(58) Field of Classification Search
CPC ....... G01N 15/0227; G01N 2015/0053; G01N 2015/03
USPC ...................................................... 356/335
See application file for complete search history.

(56) References Cited

U.S. PATENT DOCUMENTS

| 4,868,128 | A | 9/1989 | Sommer |
| 7,634,129 | B2 | 12/2009 | Strom |
| 8,780,181 | B2 | 7/2014 | Olesen |
| 2003/0133111 | A1* | 7/2003 | Yamaguchi ........ G01N 15/1456 356/336 |
| 2005/0099626 | A1 | 5/2005 | King |
| 2009/0185714 | A1* | 7/2009 | Lindberg .................. G06T 7/40 382/100 |

(Continued)

FOREIGN PATENT DOCUMENTS

| CN | 211978616 U | 11/2020 |
| EP | 0644414 B1 | 11/2001 |

(Continued)

OTHER PUBLICATIONS

Search Report and Search Opinion by the Danish Patent Office for Danish Patent Application No. PA 2023 70385, Feb. 1, 2024, 10 pages.

(Continued)

*Primary Examiner* — Tri T Ton
(74) *Attorney, Agent, or Firm* — Boone IP Law

(57) ABSTRACT

A method of determining at least one property associated to a dry particulate substance is disclosed. The method includes providing a sample support capable of containing a liquid medium; providing a dispersed sample including a portion of the particulate substance dispersed in a portion of liquid dispersing medium in the sample support, performing at least one scanning procedure including acquiring a plurality of light transmission images of an image acquisition area translated along a scanning path through the dispersed sample in the sample support using an image acquisition device having an optical axis; processing a plurality of the acquired images and determining said at least one property.

22 Claims, 9 Drawing Sheets

(56) References Cited

U.S. PATENT DOCUMENTS

| | | |
|---|---|---|
| 2010/0326213 A1 | 12/2010 | Davidson |
| 2019/0161361 A1 | 5/2019 | Tsunematsu |
| 2019/0225503 A1 | 7/2019 | Okada |
| 2020/0096434 A1 | 3/2020 | Deran |

FOREIGN PATENT DOCUMENTS

| | | | | |
|---|---|---|---|---|
| GB | 2575656 A | 1/2020 | | |
| IN | 201731020161 A | 12/2018 | | |
| JP | 2009042228 A | 2/2009 | | |
| WO | WO-2004086503 A1 * | 10/2004 | ......... | G01N 15/1468 |
| WO | WO-2007117987 A2 * | 10/2007 | ........ | B01L 3/502715 |
| WO | 2010063293 A1 | 6/2010 | | |
| WO | WO-2014094790 A1 * | 6/2014 | ......... | G01N 15/0227 |
| WO | 2014145983 A1 | 9/2014 | | |
| WO | 2014169921 A1 | 10/2014 | | |
| WO | 2019202123 A1 | 10/2019 | | |
| WO | 2019202124 A1 | 10/2019 | | |
| WO | 2019202129 A1 | 10/2019 | | |
| WO | WO-2022258715 A1 * | 12/2022 | ............. | C04B 28/04 |

OTHER PUBLICATIONS

Particle Tech Solutions, "Disrupting Process Optimization in Laboratory and Production," Brochure [online], Archived by Wayback Machine, Dec. 8, 2022, 4 pages.

Particle Tech Solutions, "The Smallest Things make a Big Difference," Brochure [online], Archived by Wayback Machine, Jan. 18, 2021, 2 pages.

* cited by examiner

Fig. 7
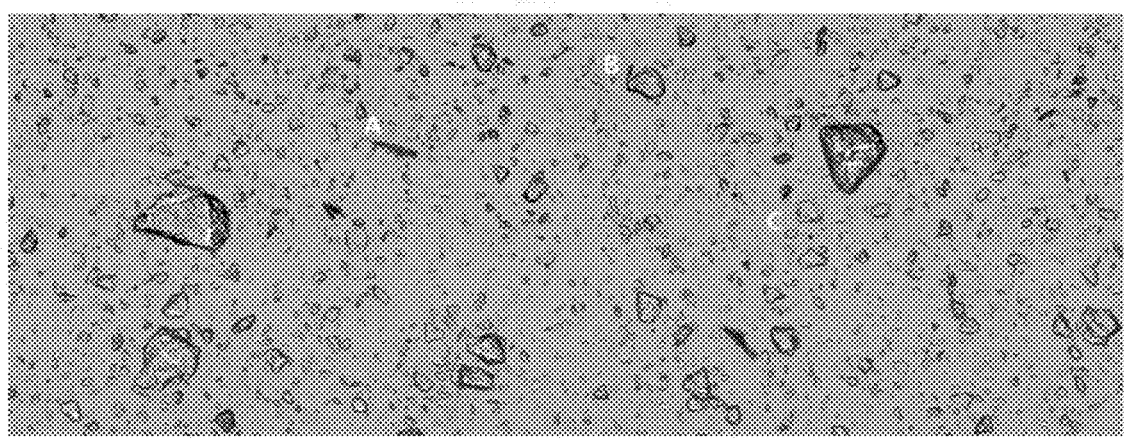
 Ingredient A  Ingredient B  Ingredient C

METHOD OF DETERMINING AT LEAST ONE PROPERTY ASSOCIATED TO A DRY PARTICULATE SUBSTANCE

CROSS REFERENCE TO RELATED APPLICATIONS

The present application claims the benefit of Danish Application No. PA 2023 70385, filed on Jul. 20, 2023. The entire contents of Danish Application No. PA 2023 70385 are hereby incorporated herein by reference in their entirety.

TECHNICAL FIELD

The invention relates to a method for determining at least one property associated to a dry particulate substance, such as a granulated substance a, crystallized substance, a crushed substance or any other particulate substance.

BACKGROUND ART

It is well known to perform analysis of particles to determine one or more properties. For example particle size analysis is often of crucial importance for research projects, product development, process control, quality control, and other technical activities where particle size effects may be important, for example in the production of paints, inks, filled plastics, ore processing, pharmaceuticals agricultural and cosmetic accurate particle size determination is often highly important. It is well known to apply laser diffraction techniques for performing such particle size determinations. For many prior art analysis of dry particles it is not even possible to distinguish between particle types due to lack of morphological information.

The clumping effect of particles is specifically pronounced when the particulate substance comprises relatively small particles, such as particles of less than a few mm due to electrostatic interactions between particles.

In CN211978616 is described a dynamic particle image particle size and particle shape analyzer adopting dry electromagnetic vibration to separate particles. The analyzer is subjecting the particles to vibrations and pouring the particles into a blanking channel from where the particles can slide rightwards and finally fall off through the blanking channel. A particle group forms a waterfall type material curtain, so that the particles are dispersed and the camera can shoot the particles in a falling state in time, and subsequent analysis is facilitated.

This image particle size and particle shape analyzer is very time consuming to operate and in addition obtaining an image of the particles in a falling state may not result in a reliable analysis. Further, this method may not be suitable for particulate substances comprising relatively small particles IN201731020161 describes another method of analyzing dry particulate substances using images, comprising using an automated spreading arrangement of chili on a moving bed mechanical system and a machine vision technology backed up by advanced image analysis algorithms for rapid and automatic quality characterization of dry chili based on physical property like size, color, shape etc. A vibratory dispensing unit separates the chili sample on a moving bed dropping from a hopper, such that, the chili sample are non-overlapping and non-touching with each other. A digital camera continuously captures the image frames of the chili samples in moving bed and the images are analyzed automatically by advanced image analysis algorithms to extract the appearance based quality parameters of the chili samples and finally it gives an estimation of export quality parameters as output to the users.

US2010326213 describes an apparatus for dispersing a sample of particulate material, includes a carrier having a sample-bearing surface on which to place the sample, and a housing for forming a dispersion chamber, at least when closed off at a base. The carrier is arranged such that the sample-bearing surface is removed from contact with the sample upon application of a sufficient pressure differential across the carrier between the sample-bearing surface and an opposite side of the carrier. The housing has an inlet at least partially facing the base. The apparatus includes an apparatus for passing a volume of gas, such as air past the carrier through the inlet by subjecting the carrier to a pulsed positive pressure differential relative to the dispersion chamber.

None of the above discussed prior art solution provides a desired solution and there is therefore still a need for new and effective methods for analyzing dry particulate substances.

DISCLOSURE OF INVENTION

An objective of the present invention is to provide a method of determining at least one property associated to a dry particulate substance, which is relatively fast and cost effective and by use of which at least one desired property may be determined with a high accuracy In an embodiment, it is an objective to provide a method of determining one or more desired properties associated to a dry particulate substance, such as determining one or more morphological properties, comprising shape(s) and size(es) with high accuracy, In an embodiment, it is an objective to provide a method of determining at least one property relating to type or types of particles, preferably to enable distinguishing between particle types baser on morphological determinations.

In an embodiment, it is an objective to provide a method of determining at least one property of a dry particulate substance, such as at least one property comprising a size, a size distribution, a form factor and/or a spectral information of the particulate substance.

In an embodiment, it is an objective to provide a method of determining at least one chemical property of the dry particulate substance.

These and other objects have been solved by the invention or embodiments thereof as defined in the claims and/or as described herein below.

It has been found that the invention or embodiments thereof have a number of additional advantages, which will be clear to the skilled person from the following description.

Particulate substances, such as powders, have diverse applications in many different manufacturing fields, such as dyes, ceramics, petroleum, cosmetics, pharmaceuticals, and food. The need for examination methods in the production and processing of such particulate substance is therefore highly important.

The inventors of the present invention have found that a surprisingly effective method of determining at least one property associated to a dry particulate substance, wherein the method comprises providing a liquid dispersion the dry particulate substance and acquiring a plurality of light transmission images of the dispersed particulate material. It has been found that the method effectively and with high accuracy may result in obtaining very accurate and valuable morphological determinations of the particulate substance.

In addition, method is relatively simple to perform and may be performed on-site, e. g. in a factory for quality control of intermediate or final products.

The terms "image" and "frame" are used interchangeable.

The phrase "a property associated to a dry particulate substance" is herein used to denote a property of the dry particulate substance or a property involving or at least partly caused by the dry particulate substance. In an embodiment, the at least one property associated to a dry particulate substance comprises at least one property of the dry particulate substance. In an embodiment, the at least one property associated to a dry particulate substance comprises at least one property of the dry particulate substance in combination with at least one other substance. In an embodiment, the at least one property associated to a dry particulate substance comprises at least one property of the dry particulate substance when subjected to one or more other substances. In an embodiment, the at least one property associated to a dry particulate substance comprises at least one property of another substance when subjected the substance.

The terms "user" and "operator" are used interchangeable.

It should be emphasized that the term "comprises/comprising" when used herein is to be interpreted as an open term, i.e. it should be taken to specify the presence of specifically stated feature(s), such as element(s), unit(s), integer(s), step(s) component(s) and combination(s) thereof, but does not preclude the presence or addition of one or more other features.

Throughout the description or claims, the singular encompasses the plural and the plural encompasses the singular unless otherwise specified or required by the context.

The "an embodiment" should be interpreted to include examples of the invention comprising the feature(s) of the mentioned embodiment.

The term "substantially" should herein be taken to mean that ordinary product variances and tolerances are comprised. All features of the invention and embodiments of the invention as described herein, including ranges and preferred ranges, may be combined in various ways within the scope of the invention, unless there are specific reasons not to combine such features.

Unless other is specified, any properties, ranges of properties and/or determination and/or assay condition is given or provided at 1 atmosphere and 25° C.

All features of the invention and embodiments of the invention as described herein including ranges and preferred ranges may be combined in various ways within the scope of the invention, unless there are specific reasons not to combine such features.

The method of determining at least one property associated to a particulate substance comprising, wherein the wherein the particulate substance is a dry particulate substance comprises
 providing a sample support capable of containing a liquid medium;
 providing a dispersed sample in the sample support comprising dispersing a portion of the dry particulate substance in a portion of liquid dispersing medium,
 performing at least one scanning procedure,
 determining the at least one property.

The dry particulate substance advantageously comprises a powder, such as a flowable powder.

Dry particulate substances usually comprises a mixture of particle sizes, such as dry particulate substance in different manufacturing fields, such as dyes, ceramics, petroleum, cosmetics, pharmaceuticals, and food. It is well known in the art that the smaller the particles, the more difficult it is to perform a proper examination due to interparticle forces that becomes more dominant the smaller the particles. For particles having a particle size of 1 mm or less and in particular even smaller particles, such as of 0.1 mm or less, interparticle forces, such as van der Waals forces and electrostatic forces becomes dominant for these small particles and it is as a result in a very high degree of surface sticking and interaction with neighboring particles.

It is well known, that when a dry particulate substance comprising particles having a particle size of 1 mm or less, such as 0.5 mm or less, such as 0.1 mm or less becomes humidiated, an even higher cohesive force between such small particles and other particles of the particulate substance will be observed.

It could therefore not have been expected or predicted that it could have been possible to analyze such dry particulate substance by the method of the present invention, and to a skilled person it is very surprisingly that the method of the invention may ensure a very detailed and valuable analysis of a dry particulate substance.

The invention has been found to be very suitable where the dry particulate substance comprises particles having a particle size of 1 mm or less, such as 0.5 mm or less, such as 0.1 mm or less.

Advantageously, the method comprises preparing the dispersed sample by a method comprising mixing the dry particulate substance with the liquid dispersion medium, wherein the, concentration of the particulate substance is not exceeding 40 mg particulate substance per 1 mL liquid dispersion medium, wherein the method preferably comprises providing the particulate substance and the liquid dispersion medium in a stream, such as a gentle stream into the sample support, preferably the concentration of the particulate substance is from 1 to 35 mg/ml liquid dispersion medium, such as from 5 to 20 mg/ml liquid dispersion medium such as from 8 to 15 mg/ml liquid dispersion medium.

It has been found that by preparing the dispersed sample using a relatively large amount of liquid dispersing medium, the interparticle forces may surprisingly be overcome and no increased interparticulate cohesiveness due to humidity has been observed.

It has been found that the dry particulate substance may be dispersed by the liquid dispersing medium in a very gently way to have a desired dispersion of the particulate substance, wherein even small particles, such as particles having a particle size of 1 mm or less, such as 0.5 mm or less, such as 0.1 mm or less are dispersed, without any significant damage of the particles, For example it has been found that excellent dispersion of the particulate substance may be obtained without any observed breaking up of particles or of agglomerates. Thereby the method ensures that the at least one property associated to the dry particulate substance may be determined with a very high accuracy.

Advantageously, the providing of the dispersed sample comprises dispersing the particulate substance without need for stirring or shaking, which further reduces the risk of altering or damaging the particles, such as the risk of breaking up agglomerations.

In an embodiment, the step of performing at least one scanning procedure comprises performing one single scanning procedure.

In an embodiment, the step of performing at least one scanning procedure comprises performing two or more scanning procedures, such as 3 or more scanning procedures or as many scanning procedures as may be desired for the particular assessment. Advantageously, the number of scanning procedures required or desired for determining the at least one property associated to the dry particulate substance may be from 1 to 100 or even more. Preferably, the number of scanning procedures required or desired for determining the at least one property associated to the dry particulate substance may be from 1 to 25, such as from 10. In certain embodiments, as will be clear from the following description, at least two scanning procedures may be required.

Each of the one or more scanning procedure comprises
image acquisition comprising acquiring a plurality of light transmission images of an image acquisition area translated along a scanning path through the dispersed sample in the sample support using an image acquisition device having an optical axis and
processing a plurality of the acquired images.

Where the method comprises performing two or more scanning procedures, the respective scanning procedures may in an embodiment be performed one after another. In an embodiment, two or more scanning procedures may be performed interleaved, e.g. comprising performing a starting a scanning procedure before a previous scanning procedure is finished. In an embodiment, two or more scanning procedures may be performed amalgamated, e.g. comprising performing the image acquisition of the two or more scanning procedures followed by performing the processing of the two or more scanning procedures. In an embodiment, two or more scanning procedures may be performed with a time slot between the two or more scanning procedures.

The image acquisition area may be perpendicular to the optical axis of the image acquisition device.

Advantageously, the processing of the image comprises obtaining a set of images. The obtaining of the set of image of the acquired images may conveniently comprise pre-processing the acquired images by a filtering process to remove blur or other artefacts e.g. using known filtering processes. The pre-processing may further comprise synthesizing one or more of the acquired images with previously acquired images to improve image quality. Such pre-processing activities are known in the art. Preferably the determination of the at least one property comprises determining the at least one property at least partly from the set of images.

Advantageously, the set of images comprises at least two different images comprising a same particle of the particulate substance of the dispersed sample. Thereby it may be possible to obtain a perspective view of the particle and preferably to generate a 3D view from at least a part of the particle. Advantageously, the set of images comprises 3 or more different images comprising the same particle of the particulate substance of the dispersed sample, which thereby may increase the view of the particle and reveal desired morphological details.

In an embodiment, the scanning procedure comprises performing a sub-determination of the at least one property. The determination of the at least one property may then conveniently comprise determining the at least one property at least partly from the sub-determination of the at least one property. In this embodiment the method may conveniently comprises processing the sub-determination of the at least one property optionally in combination with one or more other known parameters, such as a reference parameter, a calibration curve and/or a parameter correlated to the liquid dispensing medium.

In an embodiment, the performing of the at least one scanning procedure comprises performing two or more scanning procedures and wherein the determination of the at least one property comprises determining the at least one property at least partly from the sub-determination of the at least one property of the two or more scanning procedures.

In this embodiment the method advantageously comprises performing two or more scanning procedure in which a sub-determination of the at least one property may be performed in each of the two or more scanning procedure and where after the determination of the at least one property is performed at least partly based on the two or more sub-determination. The at least one property may in this embodiment advantageously comprise a determination of one or more changes associated to the dry particulate substance.

The two or more scanning procedures may for example be consecutive scanning procedures or it may be selected scanning procedures from a series of scanning procedures. The two or more scanning procedures may for example be performed with a time slot between the two or more scanning procedures, wherein the time slot may be selected to have a duration selected in dependence of the one or more changes associated to the dry particulate substance that is/are to be determined. Where the change(s) or suspected change(s) is estimated to occur fast the duration of the time slot may advantageously be relatively short and where the change(s) or suspected change(s) is estimated to take longer time the duration of the time slot may advantageously be longer and/or one or more additional scanning procedures including performing additional sub-determination(s) may be performed and compared with the one or more previous sub-determinations.

The acquisition of plurality of light transmission images of the image acquisition area along the scanning path through the dispersed sample in the sample support, may advantageously comprise illuminating at least the image acquisition area along the scanning path by emitting light from an illumination device through the dispersed sample towards the image acquisition device and acquiring the light transmission images using the image acquisition device. Thereby the acquired images may be sharper and of higher quality.

In an embodiment, the illuminating of the image acquisition area comprises emitting a light beam from the illumination device and towards the image acquisition device, wherein at least a portion of the light beam passes through the acquisition area to the and wherein the method comprises shaping the light beam to comprise converging bundle of light rays at the acquisition area. It has been found, that by providing that the light beam to comprise converging bundle of light rays at the acquisition area, the acquired images may reveal more morphological details than where the light beam is not converging.

The converging bundle of light rays may advantageously have a vertex angle of up to 75°, such as from 5° to 65°.

In an embodiment, the acquisition of plurality of light transmission images of the image acquisition area along the scanning path through the dispersed sample in the sample support advantageously comprises acquiring the light transmission images of the image acquisition area at respective selected locations along the scanning path.

The scanning path may have any length and shape, advantageously the scanning path is at least in a path length section along the optical path of the image acquisition device, The acquisition of a plurality of light transmission images may comprise acquisition of a plurality of light transmission images of the image acquisition area translated along a two or more scanning paths through the dispersed sample.

The scanning path(s) may comprise at least a straight path length section perpendicular to a horizontal plan or in an angle to the horizontal plan, such as orthogonal to the horizontal plan.

In an embodiment, the scanning path(s) comprises at least a straight path length section perpendicular to an interface plan between the sample support and the dispersed sample or in an angle to, such as orthogonal to the interface plan between the sample support and the dispersed sample.

In a preferred embodiment, wherein the scanning path(s) comprise at least one straight path length section in a horizontal plan, the image acquisition area has a slightly angled plan relative to the horizontal plan, such as an angle of from 2 degrees to 20 degrees to said path length, preferably said image acquisition area has an angle of from 5 degrees to 15 degrees to said path length, such as from 6 degrees to 7 degrees.

Thereby very detailed 3D images of the particles of the particulate substance may be obtained by stitching sub-images of same particles from two or more light transmission images.

The angle of the image acquisition area relative to the horizontal plan may preferably be selected in dependence of the height of the dispersed sample in the sample support and the size of the image acquisition area to provide that the image acquisition area extends over the entire height of the dispersed sample in the sample support.

The eight of the dispersed sample in the sample support may for example be from 50 µm to 500 µm, such as from 100 µm to 200 µm.

The acquisition of plurality of light transmission images of the image acquisition area along the scanning path through the dispersed sample in the sample support may conveniently comprise translating the image acquisition area stepwise along the scanning path and acquiring the light transmission images between motions of respective steps of the stepwise translation. The step of the respective steps may be equal or different from each other. Examples of suitable step lengths comprises step lengths up to 1 cm, such as between 1 µm and 0.5 cm.

The step length may advantageously be selected in dependence of the particulate material that is analyzed and the property or properties that are to be determined.

The dispersion medium may in principle be any liquid medium preferably having a relatively low viscosity, such as up to about 100 Pa*s, such as from 0.5 mPa*s to 100 Pa*s at the temperature and pressure of providing the dispersed sample.

The liquid dispersing medium may beneficially be selected in dependence of the dry particulate substance and the at least one property that is to be determined.

In an embodiment, the method comprises selecting the liquid dispersing medium to be non-reactive and/or non-dissolving of the dry particulate substance when mixing with the dry particulate substance. When the dry particulate substance has been mixed with the liquid dispersing medium to provide the dispersed sample, the previously dry particulate substance is referred to as the particulate substance. Advantageously, the liquid dispersing medium is selected to be non-reactive and/or non-dissolving of particulate substance at least during the acquisition of the plurality of light transmission images, such as at least during the time it takes to acquire the plurality of light transmission images in the performing of the one or more scanning procedure(s).

Where the liquid dispersing medium is selected to be non-reactive and/or non-dissolving of particulate substance the at least one property to be determined may aptly be or comprise one or more properties of the dry particulate substance, such as a morphological characteristic parameter of the dry particulate substance; a particle size characteristic parameter of the dry particulate substance; a shape characteristic parameter of the dry particulate substance; a purity characteristic of the particulate substance; a quantification of one or more particle type of the dry particulate substance; a residual water content of the dry particulate substance; a density characteristic of the particulate substance; a flowability characteristic of the particulate substance; a wettability characteristic of the particulate substance and/or any combinations comprising one or more of these properties.

In an embodiment, the method comprises selecting the liquid dispersing medium to be at reactive and/or dissolving for at least a portion of the particulate substance. Thereby the method may be suitable for determining one or more properties comprising interaction(s) between the particulate substance and the liquid dispersing medium, impact(s) of the liquid dispersing medium on the particulate substance and/or impact(s) of the particulate substance on the liquid dispersing medium.

A liquid dispersing medium having (or optionally being suspected of having) a reactivity to at least one compound or element of the particulate substance and/or a dissolution effect of at least one compound or element of the particulate substance is herein referred to as an active liquid dispersing medium and a reaction or dissolution caused by the liquid dispersing medium is referred to as a dynamic property.

A liquid dispersing medium that does not have a reactivity to at least one compound or element of the particulate substance and/or that does not have dissolution effect of at least one compound or element of the particulate substance is herein referred to as an inert liquid dispersing medium and property determined where no change is observed or observable is referred to as a static property.

The liquid dispersing medium may for example be selected such that it has or is suspected to have a reactivity to at least one compound or element of the particulate substance. The reactivity or suspected reactivity may beneficially be a chemical or a physical reaction, such as a reaction causing a decomposition, a reaction causing a structural change, a replacement reaction, a polymerization reaction swelling, gelling or any combinations thereof.

Examples of reactions may comprise one or more of the below mentioned reactions which may be caused by chemical, physical and/or thermal changes Particle swelling/gelling (e.g. observable as a change in particle morphology and/or particle size);

Particle dissolution (e.g. observable as a change in particle size, particle morphology and/or an optical change of the liquid dispersing medium);

Particle transformation (e.g. observable as a change in particle morphology, change in particle size and/or gas bobble formation), such as
  Solid-to-solid transformations
  Solid to liquid to solid transformations
  Solid-to-gas transformation;

Particle surface modification/functionalization (e.g. observable as a change in particle-particle and/or particle—sample support surface attraction and/or repelling);

Particle sedimentation/floatation (e.g. observable as a change in particle location and/or motion), such as Due to changes in particle density compared to liquid density.

Due to changes in the magnetic field;

Particle cross-linking (e.g. observable as a change in particle size or shape);

Production of gas (e.g. observable as formation of gas bobbles);

Reaction in fluid (e.g. observable in optically of the liquid dispersing medium).

In an embodiment, the liquid dispersing medium has or is suspected to have a dissolution effect of at least one compound or element of the particulate substance, such as a salt. This embodiment is especially suitable for determining if a certain component, such as a mineral is present in the dry particulate substance and optionally comprises providing an estimate of the qualitative and/or quantitative content of such component of the dry particulate substance.

Advantageously, the performing of the at least one scanning procedure comprises performing two or more consecutive scanning procedures for example as described above applying interleaved and/or amalgamated scanning procedures and wherein the determination of the at least one property comprises determining if a reaction and/or dissolution has occurred. Preferably the method comprises determining a degree of occurred reaction and/or dissolution, such as determining a degree of occurred reaction and/or dissolution as a function of time.

In an embodiment, the performing of the at least one scanning procedure comprises performing two or more consecutive scanning procedures, wherein the liquid dispersing medium at a first of the two or more scanning procedures differs from the liquid dispersing medium at a second of the two or more scanning procedures. This embodiment may advantageously comprises providing a first dispersed sample comprising a portion of the particulate substance dispersed in a portion of a first liquid dispersing medium in a first sample support, and providing a second dispersed sample comprising a portion of the particulate substance dispersed in a portion of second liquid dispersing medium in a second sample support, performing at least one scanning procedure on each of the first dispersed sample and the second dispersed sample and determining the at least one property.

Preferably the liquid dispersing medium at the first scanning procedure differs from the liquid dispersing medium at the first scanning procedures in temperature and/or in that an additive has been added, such as a pH modifying additive, a reactant, a surfactant, a refractive index modifier such as a salt or any combinations thereof.

This embodiment may for example comprise providing the dispersed sample, wherein the liquid dispersing medium is at a first temperature and performing at least one first scanning procedure. Thereafter changing the temperature, preferably by increasing the temperature and performing at least one second scanning procedure and determining the at least one property, based on the at least one first scanning procedure and on the at least one second scanning procedure.

Another example of carrying out this embodiment may comprise providing a first dispersed sample comprising a portion of the particulate substance dispersed in a portion of a first liquid dispersing medium in a first sample support, and providing a second dispersed sample comprising a portion of the particulate substance dispersed in a portion of second liquid dispersing medium in a second sample support, performing at least one scanning procedure on each of the first dispersed sample and the second dispersed sample and determining the at least one property based on the at least one scanning procedure on each of the first dispersed sample.

The second liquid dispersing medium may for example differ from the first liquid dispersing medium in that a component, such as mentioned above has been added or alternatively the second liquid dispersing medium may for example differ from the first liquid in concentration, composition, polarity color or in any other way that may contribute to determining the one or more properties.

Depending on the dry particulate substance and the liquid dispersing medium the dispersed sample may have any temperature at the scanning procedure. The sample support may aptly be selected for the desired or selected temperature to be applied. Advantageously, the dispersed sample has a temperature where it is in liquid state during the scanning procedure. In an embodiment, the dispersed sample has a temperature which may be up to a sintering temperature of the dry particulate substance or a component thereof.

The temperature may conveniently be up to 1500° C., such as up to 900° C. For most dry particulate substances a temperature of from 0 to 100° C. may be suitable.

In an embodiment, wherein the performing of the at least one scanning procedure comprises performing two or more consecutive scanning procedures, the method comprises subjecting the dispersed sample in at least one first of the two or more scanning procedures to an influence by a selected radiation and/or field selected from an electromagnetic radiation, a magnetic field and/or an electric field, and wherein the dispersed sample in at least one second of the two or more scanning procedures is not subject the selected electromagnetic radiation, magnetic field and/or electric field or is subjected to a different level of the selected electromagnetic radiation, magnetic field and/or electric field.

The method conveniently comprises selecting the liquid dispersing medium to be transparent for at least one wavelength of the light emitted from the illumination device through the dispersed sample to ensure a desired quality of the acquired images.

In an embodiment, the method comprises selecting the liquid dispersing medium to have a refractive index determined at at least one wavelength of the light emitted from the illumination device, which differs from the refractive index of the dry particulate substance. It has been found that where the refractive index of the liquid dispersing medium at the at least one wavelength of the light emitted from the illumination device differs, high quality images may be acquired. However, to obtain acquired images that allow morphological detains to be revealed, it has been found that the refractive index of the liquid dispersing medium at the at least one wavelength of the light emitted from the illumination device should advantageously not differ too much. Therefore the liquid dispersing medium may beneficially be selected to have a refractive index determined at at least one wavelength of the light emitted from the illumination device, which differs from the refractive index of at least a fraction of the dry particulate substance by from 0.01 to 0.1, such as from 0.2 to 0.5.

In an embodiment, the method comprises selecting the liquid dispersing medium to have a neutralizing effect on electrostatic interactions between particles of the dry particulate substance. Thereby the dry particulate substance may be very easily dispersed without risk of damaging the particulate substance or the structure thereof.

The liquid dispersing medium may beneficially be or comprise a non-polar liquid, such as an oil for facilitating easy dispersion of the dry particulate substance.

In an embodiment, the liquid dispersing medium is or comprises a polar liquid, such as an aqueous liquid, such as tap water, distilled and/or deionized water. Where the liquid dispersing medium is selected to induce a chemical or a physical reaction of or with the particulate substance, the liquid dispersing medium advantageously comprises water, such as laboratory water together with an active agent.

The light emitted from the illumination device may comprise one or more wavelengths, such as one or more wavelengths in the visible range from 380 to 700 nm and/or one or more wavelengths of the ultra violet and/or infrared wavelength ranges.

In an embodiment, the light emitted from the illumination device, comprises one or more wavelengths, preferably selected in the range from 380 to 940 nm, preferably comprising at least one wavelength in the range from 400 to 900 nm.

Example of suitable wavelength ranges includes wavelengths of from 250 and up to 2500 nm, such as from 250 to 900 nm, such as from 900 to 2500 nm.

Advantageously, the illumination device comprises one or more wavelengths on the visible range.

In an embodiment, the light emitted from the illumination device, comprises light of a light source adapted for emitting monochromatic light or near monochromatic light having a bandwidth if of up to 50 nm, preferably up to 10 nm, such as up to 5 nm.

The term "bandwidth" of a light source means herein the band width of the optical signal emitted from the light source including wavelength having at least half of the maximum intensity of the center wavelength CW. This is also referred to as Full Width at Half Maximum or FWHM.

For example the method may comprise illuminating the image acquisition area using two or more light sources having same or different wavelength(s) and/or by two or more light beams having same or different wavelength(s).

In an embodiment, the light emitted from the illumination device comprises structured light, such as structured light comprising a group of electromagnetic waves emitted from the illumination device and propagating along parallel or converging directions and wherein the structured light is textured seen in a cross-sectional view orthogonal to a center axis (herein also referred to as the optical axis of the emitted light) of the group of electromagnetic waves, wherein the light preferably has an intensity distribution in the cross-sectional view comprising areas of higher intensity, and areas of lower intensities or no intensity, and wherein the intensity distribution differs from a natural Gaussian intensity distribution of a light beam.

The structured light may for example have an intensity distribution in the cross-sectional view comprising lines of high intensity areas.

In an embodiment, the dispersed sample in the sample support has a surface, which at least during the acquisition of the plurality of light transmission images is non-covered to provide that the plurality of light transmission images are acquired via the non-covered surface. Thereby the risk of image artefact caused by undesired reflections may be reduced.

Advantageously, at least a portion of the sample wall, such as a bottom wall and/or a top wall of the sample support, such as the entire sample support is transparent for at least one wavelength of the light emitted from the illumination device through the dispersed sample, Examples of suitable materials for the sample support comprises polymers (e.g. polypropylene, polyethylene terephthalate and polystyrene) and/or glass In an embodiment, the sample support is in the form of a sample container, comprising an inlet for feeding the dispersed sample into the sample support and an outlet for outlet of air or a previous dispersed sample. An example of such a suitable sample support is shown in FIG. 1.

In an embodiment, at least one of the plurality of light transmission images is acquired through a polarized filter, such as a polarized lens of the image acquisition device. Thereby the acquired images may have a very high quality. It has been found than when acquiring all or some of the images through a polarized filter the risk of glare and reflections may be reduced thereby resulting in sharper and clearer images which may reveal additional morphological and topological details than without using a polarized filter. In an embodiment, the method comprise performing at least one scanning procedure using a polarized filter and performing at least one scanning procedure without using a polarized filter.

The dry particulate substance may in principle comprise particle of any size which a capable of being in a dispersed sample in the sample support. In practice it is desired that the particle size do not exceed 5 cm.

The dry particulate substance may for example comprise particles in the range of up to 2 cm, preferably from 0.1 μm to 1 cm.

The dry particulate substance may conveniently comprise non-living particles selected from inorganic particles, such as sand, minerals, clays and/or salts and/or organic particles, such as a food product, pharmaceuticals, polymers, and/or ingredients.

In an embodiment, the method comprises predrying the particulate substance to remove at least a part of unbound water.

This embodiment may be desired where unbound water may affect the dispersion and/or the determined property or properties. The predrying may comprise drying at a selected temperature to constant weight. Advantageously, the selected temperature for the predrying is a temperature that does not chemically influence the particulate substance, such as a temperature below 100° C., such as from 30 to 90° C.

The dry particulate substance may advantageously have or be dried to a content of unbound water up to 15% by weight, such as up to 10% by weight. In an embodiment, the method comprises drying the dry particulate substance to a content of unbound water up to 5% by weight, such as up to 1% by weight.

Advantageously, the performing of each of the at least one scanning procedure comprises acquisition of a plurality of light transmission images, preferably comprising comprises for one or more of the particles of the particulate substance, acquiring a set of images comprising at least one image having the particle in focus and at least one image having the particle out of focus, wherein the sets of image preferably comprises at least three images. Advantageously the method comprises processing the acquired light transmission images to synthesizing a 3D image of at least a volume of the particulate substance in the dispersed sample.

In an embodiment, the performing of the at least one scanning procedure comprises performing two or more scanning procedures comprising acquiring images of a common portion of the dispersed sample, and optionally determine if a change, such as an aging, e.g. a degradation has occurred. The two or more scanning procedures may or may not be consecutive e.g. as described above.

In an embodiment, the method comprising performing two or more runs of the determination of the at least one property associated to the dry particulate substance, wherein the two or more runs comprises performing runs, which differs in time, which differs in liquid dispersing medium, which differs in a physical influence of the dispersed sample and/or which differs in a difference of concentration of the particulate substance in the liquid dispersing medium. Thereby desired properties may be determined e.g. as described elsewhere herein.

The provision of the dispersed sample in the sample support may comprise dispersing at least the portion of the dry particulate substance in at least the portion of liquid dispersing medium and applying the dispersed sample comprising the portion of the dry particulate substance dispersed in the portion of liquid dispersing medium in the sample support. In the alternative or in addition, the provision of the dispersed sample in the sample support may comprise applying the portion of the dry particulate substance and the portion of liquid dispersing medium in the sample support simultaneously or one after the other and providing that the portion of the dry particulate substance is dispersed in the portion of liquid dispersing medium in the sample support.

In an embodiment, the method comprises preparing the dispersed sample by a method comprising mixing the dry particulate substance with the liquid dispersion medium, wherein the concentration of the particulate substance is 40 mg particulate substance per 1 mL liquid dispersion medium, such as 1 mg particulate substance per 10 mL liquid dispersion medium. Optionally the method comprises preparing a mother sample and withdrawing the dispersed sample from the mother sample. The latter may be desired where several portions of the dispersed sample are to be analyzed using the method of an embodiment of the invention.

The at least one property associated to the dry particulate substance may conveniently comprises one or more of
- a morphological characteristic parameter of the dry particulate substance;
- a particle size characteristic parameter of the dry particulate substance;
- a shape characteristic parameter of the dry particulate substance
- a purity characteristic of the particulate substance;
- a quantification of one or more particle type of the dry particulate substance;
- a residual water content of the dry particulate substance;
- a particle distribution of one or more individual particle properties of the dry particulate substance;
- a gas production associated to the dry particulate substance;
- a density characteristic of the particulate substance;
- a flowability characteristic of the particulate substance;
- a reactivity characteristic of the particulate substance;
- a solubility characteristic of the particulate substance;
- a wettability characteristic of the particulate substance;
- a hygroscopicity characteristic of the particulate substance and/or
- any combinations comprising one or more of these properties.

In an embodiment, at least one property associated to the dry particulate substance comprises a density parameter, such as a homogeneity/inhomogeneity of density of the particles of the dry particulate substance, such as a density level of one or more of the particles of the dry particulate substance.

In an embodiment, the liquid dispersing medium is selected to have a measure density, wherein the method comprises determining the density/densities of particles of the particulate substance relative to the measure density, such as determining if one or more particle of the particulate substance of the sample has a higher, a lower or similar density relative to the measure density.

In an embodiment, the at least one property associated to the dry particulate substance comprises a determination of setting time, such as setting times in two different liquid dispersing media.

In an embodiment, the at least one property associated to the dry particulate substance comprises a qualitative and/or a quantitative determination of presence of impurities.

It has been found that the method of the invention may comprise a qualitative and/or a quantitative determination of presence of impurities, Impurities may for example be identified by a morphological parameter, a shape parameter and/or a density parameter. The method of the invention has been found to be very fast and effective for identifying impurities in a dry particulate substance. This may in particular be desired for quality control of raw materials.

The invention also comprises use of the method described above as a tool in performing at least one of a process optimization, a process development and a quality control of a production process comprises producing a product comprising the dry particulate substance.

The invention further comprises a method of processing comprising determining at least one property associated to a particulate substance, wherein the particulate substance is a dry particulate substance, wherein the method of processing comprises the method described above.

Advantageously, and wherein the processing method comprises determining if the at least one determined property fulfil a quality criterion. The criterion may be any criterion associated to the particulate substance. The quality criterion may preferably comprise at least one threshold or a threshold range for the at least one property. The at least one threshold may for example comprise a threshold value and wherein if the determined property is determined to have a value exceeding the threshold value, the determined property fulfil the quality criterion.

In an embodiment, the processing comprises manufacturing a product comprising using the dry particulate substance as a raw material and/or manufacturing the dry particulate substance as a precursor product or a final product.

In an embodiment, the processing comprises analyzing a raw material for use in manufacturing a product, wherein the dry particulate substance form part of the raw material. The raw material may for example comprises a natural material, such as a natural material which has been subjected to a pre-treatment, such as a mechanical treatment, such as a treatment comprising a crushing treatment, a grinding treatment, a washing treatment, a drying treatment, a filtering treatment or any combinations comprising at least one of the mentioned treatments.

Examples of natural materials includes sand, soil, rocks (crushed and grinded)

In the embodiment, wherein the processing comprises analyzing a raw material for use in manufacturing a product, the at least one property may for example comprise qualitative and/or a quantitative content of at least one element, such as qualitative and/or a quantitative content of a mineral. The method may conveniently comprise determining if the content of the at least one element fulfil a quality criterion. The quality criterion may for example comprise a minimum threshold, a maximum threshold and/or a threshold range for a required content of the at least one element. In an embodiment, the quality criterion comprises a criterion of the quality of the mineral and/or a criterion associated to how simple or difficult it may be to mining from the dry particulate substance.

In an embodiment, the processing comprises manufacturing the dry particulate substance as a precursor product. The method may advantageously comprise withdrawing a sample of the particulate substance during a process step or after a process step, such as a granulating process step, a grinding process step, a washing step, a reaction step or any other process step where the sample of the particulate substance may be withdrawn for analyzing. The particulate substance may optionally be dried to obtain the dry particulate substance. Thereafter the at least one property associated to the dry particulate substance may be determined as described above.

In an embodiment, the processing comprises manufacturing the dry particulate substance as a final product, such as a final product ready for packing and/or for transporting to a distributer or a purchaser. The method may conveniently comprise withdrawing a sample of the dry particulate substance produced and determining the at least one property associated to the sample of the dry particulate substance using the method as described above.

In an embodiment, the method comprises withdrawing a sample of the dry particulate substance, such as the dry particulate substance produced, after storing for a selected period at selected storing conditions and determining the at least one property associated to the stored dry particulate substance. Thereby it may be determined if the dry particulate substance has changed e.g. in a negative or a positive way during the storing.

Advantageously, the method comprises monitoring the at least one property associated to the dry particulate substance. The monitoring may for example comprise withdrawing samples of the stored dry particulate substance at selected time intervals and determining the at least one property associated to the stored dry particulate substance. Thereby potential changes of the at least one property associated to the stored dry particulate substance may be monitored in a relatively simple way. The time slots between the withdrawing of samples may be selected in dependence of previous experience and/or in dependence of expected time durations for occurrence of detectable change of the at least one property.

In an embodiment the method may be applied to optimize storing conditions, e.g. by storing portions of the dry particulate substance at different conditions, such as at different temperatures and/or humidity. After a selected period the portions of stored dry particulate substance may be subjected to determination of the at least one property associated to the stored dry particulate substance using the method as described above and the quality of the respective portions of stored dry particulate substance may be compared to determine the best storing conditions. The method may be repeated until satisfactory storing conditions have been determined The at least one property may advantageously comprise at least one chemical or physical property and the method may conveniently comprise determining if the at least one determined property fulfil a quality criterion. Optionally the quality criterion comprises two or more thresholds e.g. as described above.

Where it has been determined that the at least one determined property fulfil the quality criterion the method may preferably comprise continuing the manufacturing. Optionally the method may comprise adjusting the quality criterion for refining quality of the dry particulate substance, e.g. raising the quality bar.

Where it has been determined that the at least one determined property does not fulfil the quality criterion, the method may advantageously comprise adjusting at last one manufacturing parameter. The dry particulate substance or particulate substance from where the sample was withdrawn may optionally be subjected to an additional processing if required or it may be used for another purpose, where the quality criterion are less than in the first intended use. Optionally the method may eve comprise discharging the dry particulate substance or particulate substance from where the sample was withdrawn if the quality thereof is too poor. Thereby no further resources are used on a particulate substance with a too low quality.

BRIEF DESCRIPTIONS OF THE FIGURES

In the following the invention will be further illustrated by the description of a number of illustrative and non-limiting embodiments and examples of the present invention, with reference to the appended drawings.

The figures are schematic and are not drawn to scale and may be simplified for clarity. Throughout, the same reference numerals are used for identical or corresponding parts.

FIG. 7 illustrates a scanning result of a scanning procedure of an embodiment of the method of the invention, wherein the dry particulate substance is a food product.

BRIEF DESCRIPTIONS OF EMBODIMENTS AND EXAMPLES

Figure 1:
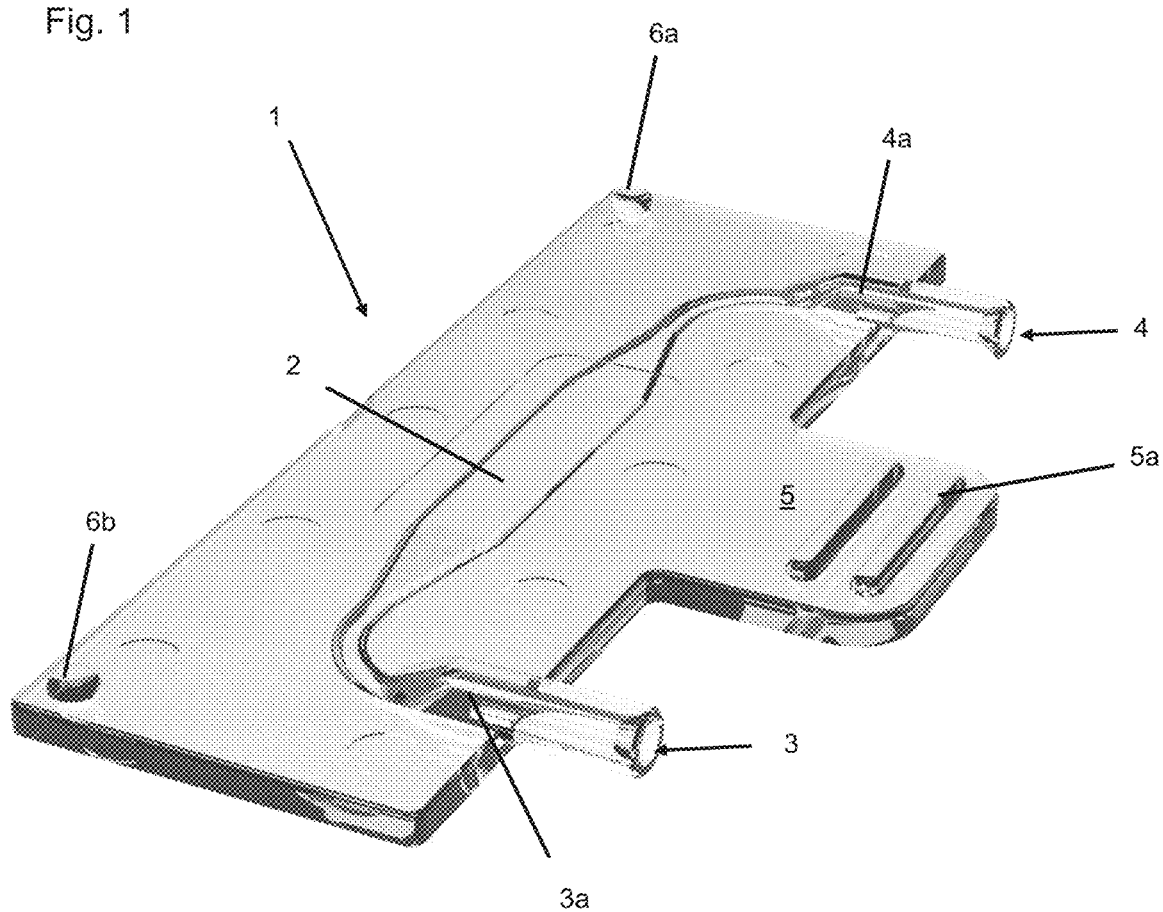
FIG. 1 is a perspective top view of a sample support suitable for use in an embodiment of the method of the invention

The sample support shown in FIG. 1 is in the form of a sample container 1 comprising a sample chamber 2 an inlet tube section 3 to the sample chamber 2 and an outlet tube section 4 from the sample chamber 2. The inlet tube section 3 comprises a back flow valve 3a resisting or preventing backflow out of the sample chamber and the outflow tube section 4 comprises a back flow valve 4a resisting or preventing backflow into the sample chamber. In a variation thereof the back flow valves 3a, 4a may be omitted and undesired back flow may optionally be controlled by a not shown pump system controlling the feeding of dispersed sample into and out of the sample chamber 2. The sample container 1 comprises a handgrip 5 comprising protruding flanges 5a for better grip. The sample container 1 is adapted for being inserted into a sample container slot of a sample container 1 adapted for performing the one or more scanning procedures and optionally programmed for determining the at least one property based on the acquired images and/or the processed acquired images. Alternative the determining the at least one property based on the acquired images and/or the processed acquired images may be performed by an external computer, such as a laptop, a tablet or a smart phone which may conveniently be in data communication by wire or wireless with the scanning apparatus. Example of suitable scanning apparatus are described in U.S. Pat. Nos. 7,634,129, 8,780,181.

When inserting the sample container 1 into a slot of a scanning apparatus, the operator may mold the sample container 1 in the hand grip 5 and insert the sample container into the slot to the sample container 1 reaches a location where protrusions 6a, 6b get into engagement with snap lock cavities to ensure that the sample container is located at a correct and fixed position.

The operator may now provide that a first sample portion of dispersed sample is fed into the sample chamber 2 via the inlet tube section 3. During the feeding of the first sample portion of dispersed sample into the sample chamber 2, gas is flowing out of the sample chamber 2 via the outflow tube section 4 until the sample chamber is full.

The feeding of the first sample portion is now terminated and the one or more scanning procedure on the first sample portion may start. Once the acquisition of the light transmission images is terminated the first sample portion may be driven out of the sample chamber 2, either by feeding a second sample portion into the sample chamber 2 via the inlet tube section 3 or by feeding gas and/or a washing fluid into the sample chamber 2 via the inlet tube section 3. The procedure may thereafter be proceeded.

The feeding of sample portion, gas and/or washing fluid may be performed manually or partly or fully automated.

Figure 2:
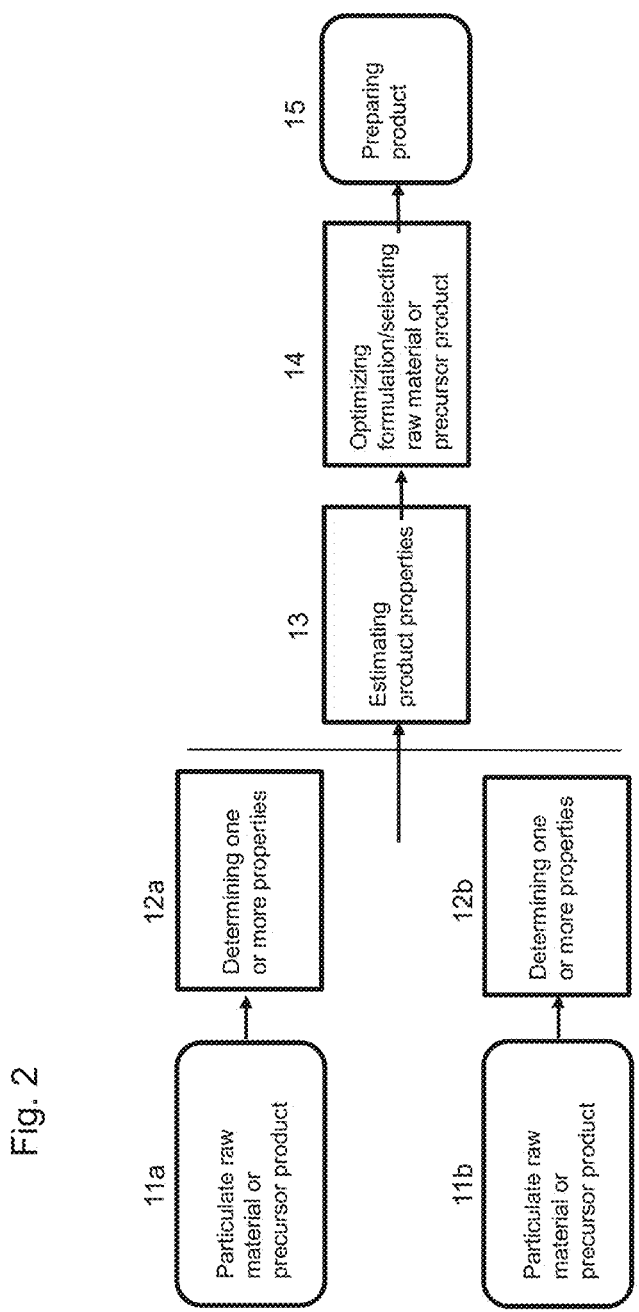
FIG. 2 illustrates a process diagram for an embodiment of the method of the invention wherein the dry particulate substance is a raw material or a precursor material for production of a product.

The process diagram of FIG. 2 shows a process for raw material or precursor material control, selection and/or modification for preparing a product e.g. in a construction applications. For many productions the quality e.g. one or more properties of portions of raw might fluctuate significantly for example to such a degree that it may be difficult to achieve a desired quality of the final products.

By determining the static and/or dynamic properties of the raw material portions r precursor material portions, it is possible to estimate the final product properties accurately. This allows for a dynamic formulation optimization for example in dependence of the determined the static and/or dynamic properties of the raw material portions optionally combined with consideration of the cost of raw materials and/or the requirements for the final product properties, such as final product quality criterion.

In step 11a a first portion of particulate raw material or precursor product is prepared for being analyzed. In step 12a a sample of the first portion is analyzed by an embodiment of the method of the invention. A dispersed sample thereof is provided in a sample container and at least one scanning procedure is performed and one or more properties associated to the first portion of particulate raw material or precursor product is determined.

This procedure is repeated for a second portion of particulate raw material or precursor product as illustrated in steps 11b and 12b.

Further portion of particulate raw material or precursor product may be analyzed in the same way e.g. as such portions are provided in the factory and/or are being prepared for being used in the production of the product.

The respective portions of particulate raw material or precursor product may advantageously, be respective batches which may be received from a sub-supplier or may be produced in a previous production step e.g. as an intermediate product.

In step 13 an estimation of product properties based on the respective portions of particulate raw material or precursor product is performed. In step 14 an optimizing formulation calculation and/or a selection of raw material or precursor product is performed. This may for example comprise that portions of particulate raw material or precursor product which are estimated to result in final produced products having a quality complying with one or more quality criterion for the final products may be forwarded directly to be used in the productions. Portions of particulate raw material or precursor product which are estimated to result in final produced products having a quality that is not complying with one or more quality criterion for the final products may be discharged or where possible mixed into one or more other portions of particulate raw material or precursor product a d optionally be forwarded to be used in the productions or be returned to the testing steps for further analysis.

Figure 3:
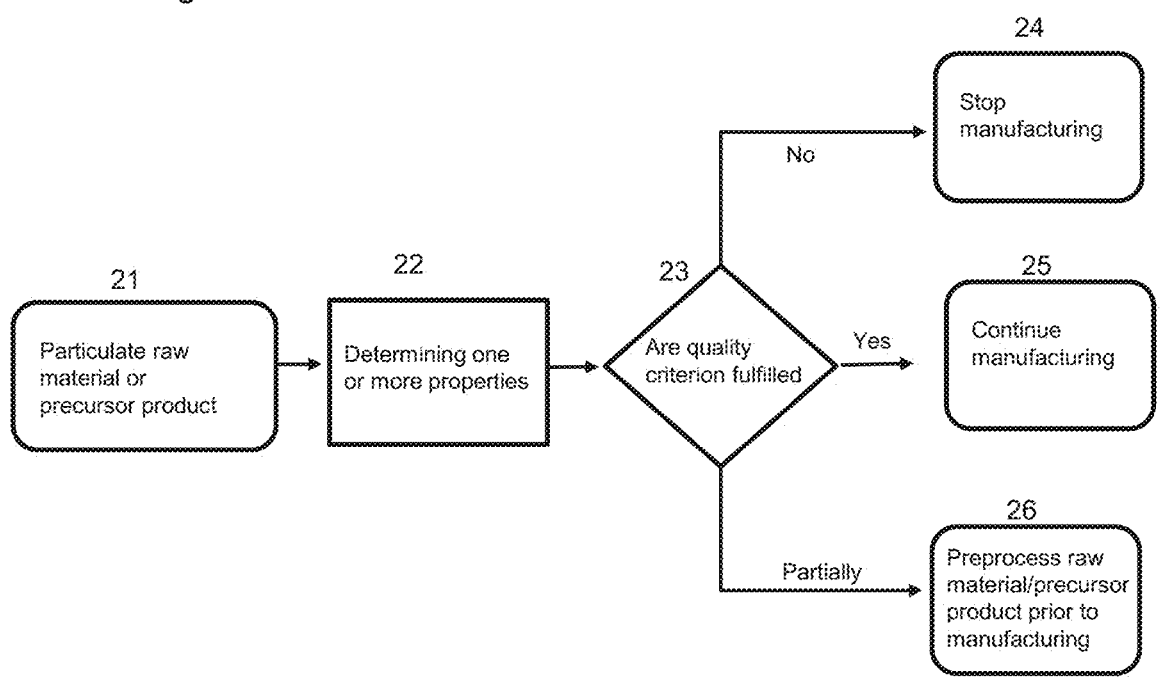
FIG. 3 illustrates another process diagram for an embodiment of the method of the invention wherein the dry particulate substance is a raw material or a precursor material for production of a product.

The process diagram shown in FIG. 3 illustrates a process comprising examination and/or monitoring of raw material or precursor material, such as incoming raw material or preprocessed or produced raw material. The raw material may for example comprise natural material, such as dry sand, soil or gravel or other extraction materials. In an embodiment particulate material is precursor material in the form of crushed material from a mining process. Here it is usually critical to assess the quality, such as the content of the mined material, including mineral composition and concentration or target minerals or metals. Using static and dynamic powder analysis according to an embodiment of the invention, it may relatively fast and in an effective way be determined if the raw material or precursor material fulfill a quality criterion e.g. if a sufficient amount of a target mineral or metal is present and the extraction of such target mineral or metal may be continued if the mined material fulfills the specific quality constraints and stopped if the extraction becomes infeasible.

In step 21 a portion of particulate raw material or precursor product is prepared for being analyzed. In step 22 a sample of the first portion is analyzed by an embodiment of the method of the invention. A dispersed sample thereof is provided in a sample container and at least one scanning procedure is performed and one or more properties associated to the portion of particulate raw material or precursor product is determined.

In step 23 it is determined in the incoming raw material/precursor material fulfill a quality criterion e.g. if a sufficient amount of a target mineral or metal is present.

If the quality criterion(s) is/are not fulfilled, the manufacturing comprising further extraction is stopped in step 24.

If the quality criterion(s) is/are fulfilled, the manufacturing comprising further extraction continued in step 25.

If the quality criterion(s) is/are partially fulfilled, the manufacturing comprising further extraction is stopped in step 26 and the raw material or precursor product may be further processed or preprocessed e.g. by an additional crushing step and the raw material or precursor product is returned to step 22 for further analysis.

Figure 4:
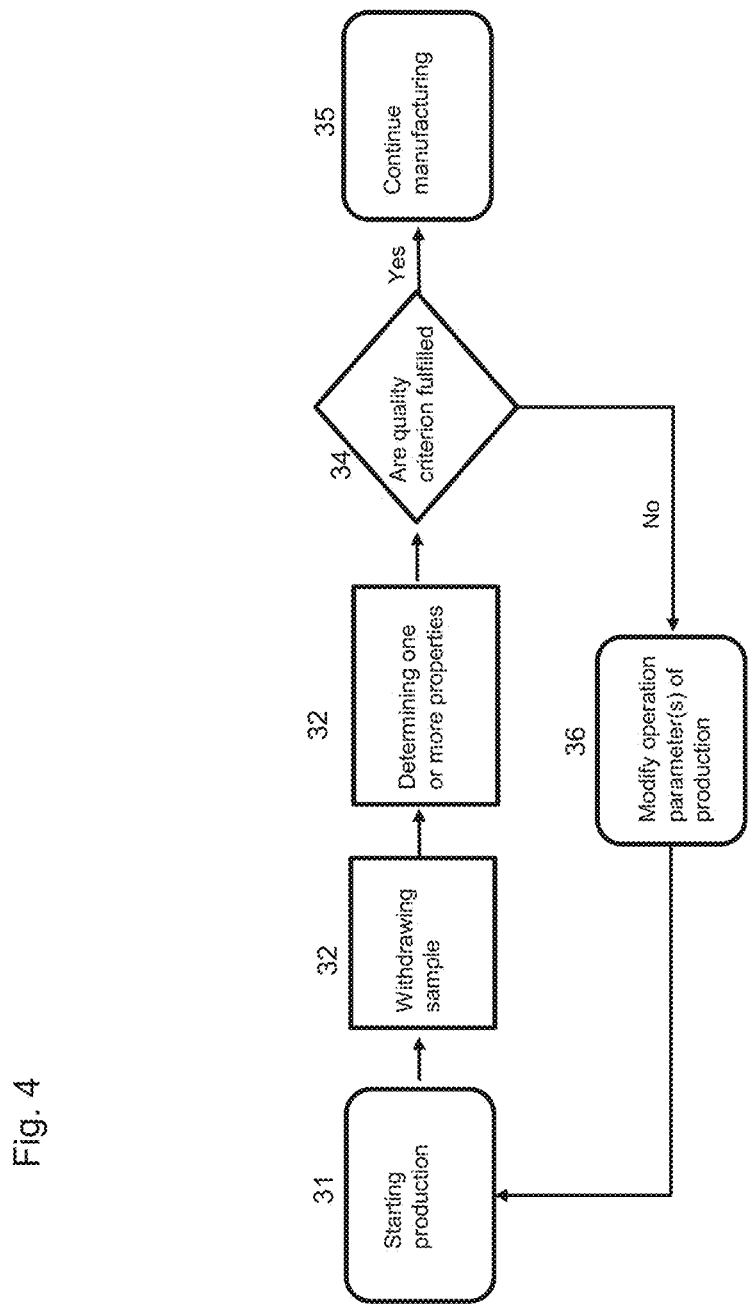
FIG. 4 illustrates a process diagram for an embodiment of the processing method of the invention comprising controlling and optionally adjusting one or more operations parameters.

The process diagram shown in FIG. 4 illustrates a process comprising a dynamic optimization of one or more operating conditions of a powder production, such as a spray drying process. Here it may be critical to obtain a high quality granulation, particle size distribution and/or shape distribution of the produced product. Furthermore, it may be beneficial to simultaneously obtain measurements of the bulk powder properties and the particle compositions e.g. in a multi-component spray drying and/or encapsulation process. If the obtained properties are not fulfilling selected quality constraints, it may here be possible to dynamically control the process by altering a selection of operating parameters.

In step 31 the production is started form one or more starting materials. In step 32, preferable at least after the production process have been carried out for sufficiently long to time to provide that the starting material(s) has been influenced by the process, a sample is withdrawn. In step 33 the sample is analyzed by an embodiment of the method of the invention. A dispersed sample thereof is provided in a sample container and at least one scanning procedure is performed and one or more properties associated to the one or more particulate substance is determined.

In step 34 it is determined in the at least one quality criterion is fulfilled. If the quality criterion(s) is/are fulfilled, the manufacturing is continued in step 35 with unchanged operation parameters. If the quality criterion(s) is/are not fulfilled, a feed-back loop is provided for modifying one or more operation parameters of the process prior to withdrawing the sample. One or more further samples may be withdrawn for controlling the operation parameters of along the production process until the final produced is reached.

Figure 5A:
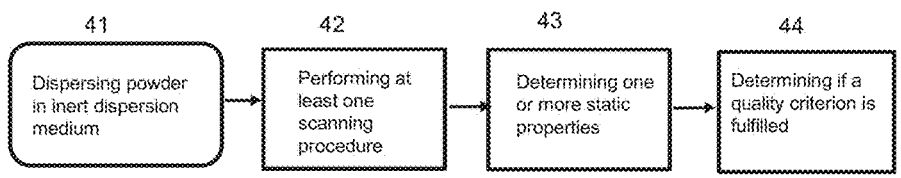
FIGS. 5a, 5b and 5c illustrate different procedures of embodiments of the processing method of the invention
Figure 5B:
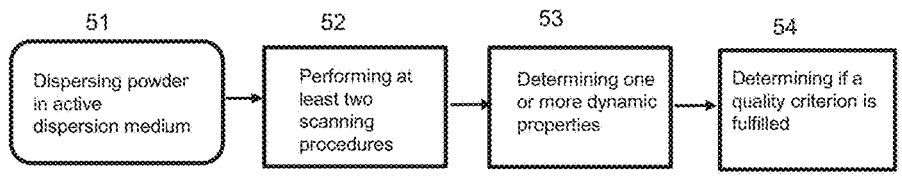
Figure 5C:
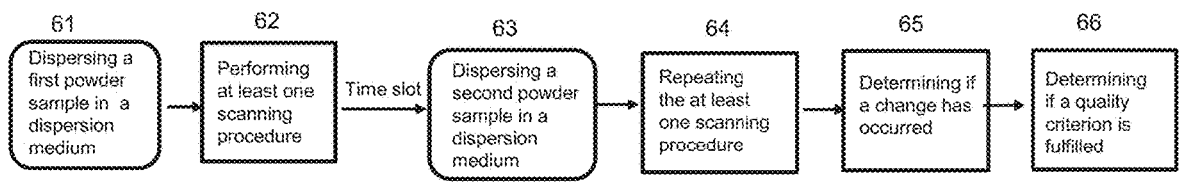

The process diagrams shown in FIGS. 5*a-c* illustrates examples of different procedures of embodiments of the processing method of the invention.

The process diagram of FIG. 5*a* illustrates an example of performing the method to determine at least one static property.

In step 41 a dry particulate substance—here a powder—is provided and a sample is dispersed in an inert dispersion medium such as a liquid dispersing medium that does not react or dissolve the particulate substance or parts thereof before or during the acquisition of images.

In step 42 the sample is analyzed by an embodiment of the method of the invention comprising providing the dispersed sample provided in a sample container and performing at least one scanning procedure. In step 43, the at least one static property is determined e.g. as described above.

In step 44 it is determined if the dry particulate substance fulfill at least one quality criterion, e.g. by correlating the at least one determined static property to a selected threshold and/or by correlating the at least one determined static property to a reference curve.

The process diagram of FIG. 5*b* illustrates an example of performing the method to determine at least one dynamic property.

In step 51 a dry particulate substance—here a powder—is provided and a sample is dispersed in an active dispersion medium such as a liquid dispersing medium having or being suspected of having a reactivity to at least one compound or element of the particulate substance and/or a dissolution effect of at least one compound or element of the particulate substance.

In step 52 the sample is analyzed by an embodiment of the method of the invention comprising providing the dispersed sample provided in a sample container and performing at least two scanning procedures, preferably with a time slot in between, where the time slot has a sufficient duration to allow the liquid dispersing medium to react with of dissolve at least one compound or element of the particulate substance. One or more additional scanning procedures may be performed over time to observe the reaction and/or dissolution as a function of time.

In step 53, the at least one dynamic property is determined e.g. as described above. It should be observed that the steps 52 and 53 may be determined interleaved or amalgamated e.g. as described above.

In step 54 it is determined if the dry particulate substance fulfill at least one quality criterion, e.g. by correlating the at least one determined static property to a selected threshold and/or by correlating the at least one determined static property to a reference curve.

In step 61 a first sample of a dry particulate substance—here a powder—is provided and the sample is dispersed in a liquid dispersion medium which may be an active liquid dispersing medium or an inactive liquid dispersing medium.

In step 62 the first sample is analyzed by an embodiment of the method of the invention comprising providing the dispersed sample provided in a sample container and performing at least one scanning procedure After a selected time slot, such as a time slot where the dry particulate substance has been stored at selected storing conditions, e.g. for days, weeks, months or even years, a second sample of the dry particulate substance is withdrawn in step 63 and dispersed in the liquid dispersing medium.

In step 64 the first sample is analyzed preferably in the same way of analyzing the first sample.

In step 65, it is determined if a change has occurred, such as a degradation e.g. comprising a hygroscopic reaction or decomposition of the dry particulate substance.

This embodiment may be very beneficial for controlling of stores dry particulate substances or storing conditions therefore and/or for optimizing storing conditions.

Figure 6:
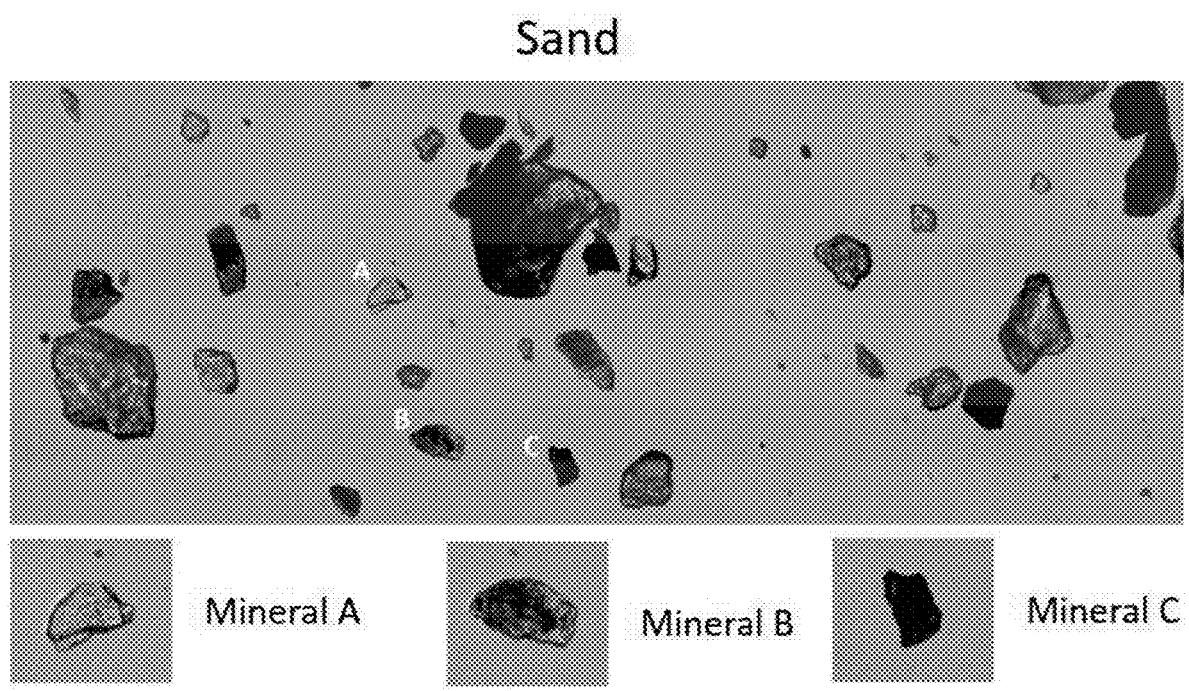
FIG. 6 illustrates a scanning result of a scanning procedure of an embodiment of the method of the invention, wherein the dry particulate substance is sand.

FIG. 6 shows a scanning result of an analysis of a sand sample. It can be seen that embodiments of the method of the invention provide detailed information about the particles of the sand sample. Based on the processed images the particle size distribution, morphological details and other properties as described above may be determined. In this example three target mineral particle types A, B and C has been identified and enlarged images thereof have been provided. Based on the processed images, the quantitative content of the respective minerals may be determined.

FIG. 7 shows a scanning result of an analysis of a food product, such as an instant dry food product comprising a plurality of ingredients. Based on the processed images the particle of the respective ingredients, such as ingredient A, ingredient B and ingredient C have been identified. Sizes, size distribution, morphological details and other properties e.g. as described above may be determined. In addition, the homogeneity of the food product may be determined. The particle size and particle distribution of the particles of various ingredients may have large impact on the texture and rheology of the food product or the final product produced from a dry instant food product.

Figure 8:
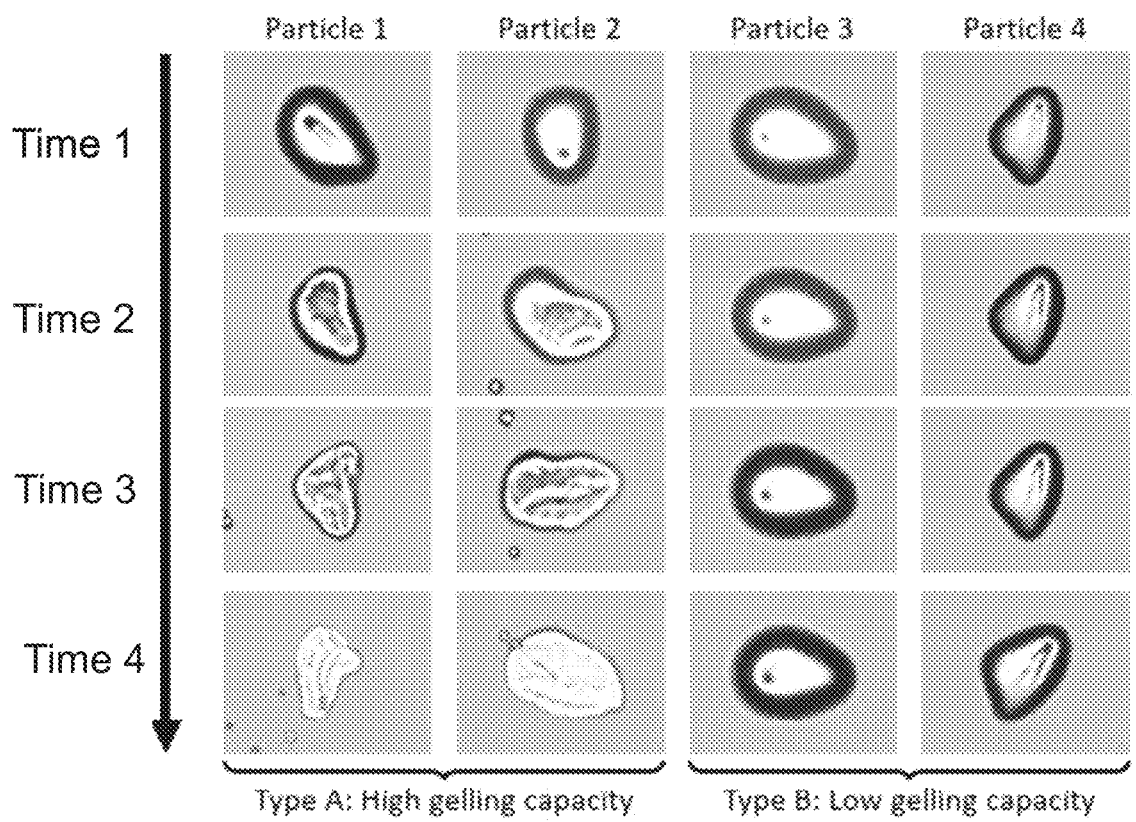
FIG. 8 illustrates a scanning result of 4 scanning procedures of an embodiment of the method of the invention, wherein the dry particulate substance is a food product and the liquid dispersing medium is an active liquid dispersing medium.

FIG. 8 show a scanning result of 4 scanning procedures of an embodiment of the method of the invention, wherein the dry particulate substance is a food product and the liquid dispersing medium is an active liquid dispersing medium. The 4 scanning procedures are performed at respectively time 1, time 2, time 3 and time 4. Four different particles have been analyzed and it can be seen that the liquid dispersing medium has caused a gelling of at least particle 1 and particle 2, whereas no significant signs of gelling is observed for particle 3 and particle 4.

Figure 9:
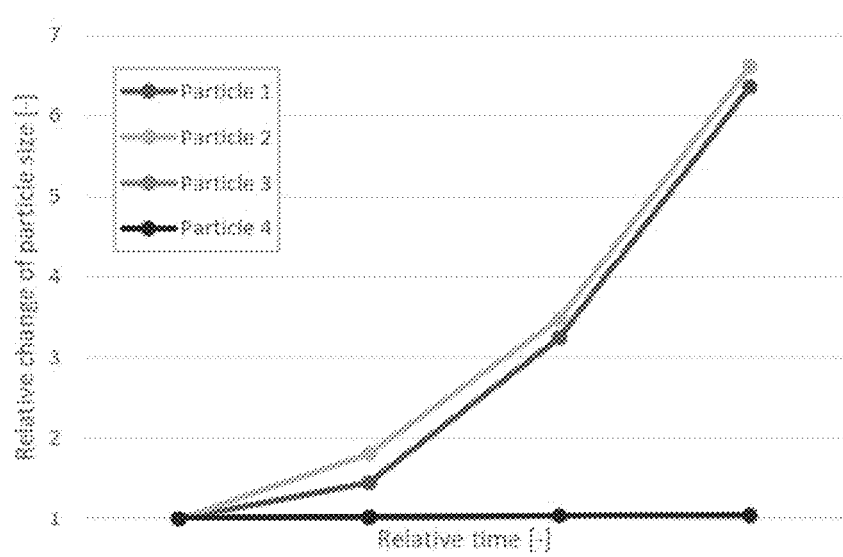
FIG. 9 is a diagram of determined reactions derived from the scanning result illustrated in FIG. 8.

In FIG. 9 the particles have been further analyzed of change in particle size and the particle size as a function of time has been plotted. It can be seen that each of particle 1 and particle 2, has a substantial increase over time of particle size, whereas no sign of increase in particle size is observed for particle 3 and particle 4.

The invention claimed is:

1. A method of determining at least one property associated to a particulate substance comprising providing a portion of the particulate substance, wherein the particulate substance and the portion thereof are dry particulate substance, the method comprises
   providing a sample support capable of containing a liquid medium;
   providing a dispersed sample comprising the portion of the particulate substance dispersed in a portion of liquid dispersing medium in said sample support,
   performing at least one scanning procedure comprising
      acquiring a plurality of light transmission images of an image acquisition area translated along a scanning path through said dispersed sample in said sample support using an image acquisition device having an optical axis and
   processing a plurality of the acquired images and
   determining said at least one property,
   wherein said image acquisition area is perpendicular to the optical axis of the image acquisition device,
   wherein the acquisition of the plurality of light transmission images of the image acquisition area along said scanning path through said dispersed sample in said sample support, comprises translating said image acquisition area stepwise along the scanning path and acquiring said light transmission images between motions of respective steps of said stepwise translations, wherein said respective steps are up to 1 cm and wherein the scanning path(s) comprise at least one straight path length section in a horizontal plan and wherein the image acquisition area has an angle of from 2 degrees to 20 degrees to said path length.

2. The method of claim 1, wherein the dry particulate substance comprises particles having a particle size of 1 mm or less.

3. The method of claim 1, wherein the method comprises preparing the dispersed sample by a method comprising mixing the dry particulate substance with the liquid dispersion medium, wherein the concentration of the particulate substance is not exceeding 40 mg particulate substance per 1 mL liquid dispersion medium.

4. The method of claim 1, wherein the providing of the dispersed sample comprises dispersing the particulate substance without stirring.

5. The method of claim 1, wherein the processing of said image comprises obtaining a set of images of the acquired images, wherein the determination of said at least one property comprising determining said at least one property at least partly from said set of images.

6. The method of claim 1, wherein the acquisition of plurality of light transmission images of the image acquisition area along said scanning path through said dispersed sample in said sample support, comprises illuminating at least said image acquisition area along the scanning path by emitting light from an illumination device through said dispersed sample towards the image acquisition device and acquiring said light transmission images using said image acquisition device.

7. The method of claim 1, wherein the illuminating of said image acquisition area comprises emitting a light beam from said illumination device and towards said image acquisition device, wherein at least a portion of the light beam passes through said acquisition area to said and wherein the method comprises shaping said light beam to comprise converging bundle of light rays at the acquisition area.

8. The method of claim 1, wherein the method comprises selecting the liquid dispersing medium to be at reactive and/or dissolving for at least a portion of the particulate substance.

9. The method of claim 1, wherein, the performing of the at least one scanning procedure comprises performing two or more consecutive scanning procedures and wherein the determination of said at least one property comprises determining if a reaction and/or dissolution has occurred.

10. The method of claim 1, wherein the performing of the at least one scanning procedure comprises performing two or more consecutive scanning procedures, wherein the liquid dispersing medium at a first of the two or more scanning procedures differs from the liquid dispersing medium at a second of the two or more scanning procedures.

11. The method of claim 1, wherein the method comprises selecting the liquid dispersing medium to have a refractive index determined at at least one wavelength of the light emitted from the illumination device, which differs from the refractive index of the dry particulate substance at said at least one wavelength.

12. The method of claim 1, wherein the method comprises selecting the liquid dispersing medium to have a neutralizing effect on electrostatic interactions between particles of the dry particulate substance.

13. The method of claim 1, wherein the method comprise illuminating said image acquisition area using two or more light beams having different wavelength(s).

14. The method of claim 1, wherein at least a portion of the sample wall is transparent for at least one wavelength of the light emitted from the illumination device through said dispersed sample.

15. The method of claim 1, wherein at least one of the plurality of light transmission images is acquired through a polarized filter.

16. A method of determining at least one property associated to a particulate substance comprising providing a portion of the particulate substance, wherein the particulate substance and the portion thereof are dry particulate substance, the method comprises
   providing a sample support capable of containing a liquid medium;
   providing a dispersed sample comprising the portion of the particulate substance dispersed in a portion of liquid dispersing medium in said sample support,
   performing at least one scanning procedure comprising
      acquiring a plurality of light transmission images of an image acquisition area translated along a scanning path through said dispersed sample in said sample support using an image acquisition device having an optical axis and
   processing a plurality of the acquired images and
   determining said at least one property,
   wherein said image acquisition area is perpendicular to the optical axis of the image acquisition device,
   wherein the method comprises predrying the particulate substance to remove at least a part of unbound water, wherein the predrying comprises drying at a selected temperature to constant weight, wherein the selected temperature is a temperature that does not chemically influence the particulate substance.

17. A method of determining at least one property associated to a particulate substance comprising providing a portion of the particulate substance, wherein the particulate substance and the portion thereof are dry particulate substance, the method comprises
providing a sample support capable of containing a liquid medium;
providing a dispersed sample comprising the portion of the particulate substance dispersed in a portion of liquid dispersing medium in said sample support,
performing at least one scanning procedure comprising
acquiring a plurality of light transmission images of an image acquisition area translated along a scanning path through said dispersed sample in said sample support using an image acquisition device having an optical axis and
processing a plurality of the acquired images and determining said at least one property,
wherein said image acquisition area is perpendicular to the optical axis of the image acquisition device,
wherein the method comprising performing two or more runs of the determination of the at least one property associated to the dry particulate substance, wherein the two or more runs comprises performing runs, which differs in time, which differs in liquid dispersing medium, which differs in a physical influence of the dispersed sample and/or which differs in concentration of the particulate substance in the liquid dispersing medium.

18. The method of claim 1, wherein the method comprises preparing the dispersed sample by a method comprising mixing the dry particulate substance with the liquid dispersion medium, wherein the concentration of the particulate substance is not exceeding 40 mg particulate substance per 1 mL liquid dispersion medium.

19. The method of claim 1, wherein the at least one property associated to the dry particulate substance comprises at least one of a density parameter selected from a homogeneity/inhomogeneity of density of the particles of the dry particulate substance or a density level of one or more of the particles of the dry particulate substance; a setting time; a qualitatively and/or a quantitatively determination of presence of impurities.

20. A method of performing at least one of a process optimization, a process development and a quality control of a production process of producing a product comprising the a dry particulate substance, wherein the method comprises determining at least one property associated to the dry particulate substance and determining if the at least one property associated to the dry particulate substance fulfil a criterion, wherein the determining at least one property associated to the dry particulate substance comprises
providing a portion of the dry particulate substance,
dispersing the dry particulate substance in a portion of a liquid dispersing medium to obtain a dispersed sample comprising the portion of the particulate substance dispersed in the portion of the liquid dispersing medium in a sample support,
performing at least one scanning procedure comprising
acquiring a plurality of light transmission images of an image acquisition area translated along a scanning path through said dispersed sample in said sample support using an image acquisition device having an optical axis and
processing a plurality of the acquired images and determining said at least one property,
wherein said image acquisition area is perpendicular to the optical axis of the image acquisition device,
wherein the acquisition of the plurality of light transmission images of the image acquisition area along said scanning path through said dispersed sample in said sample support, comprises translating said image acquisition area stepwise along the scanning path and acquiring said light transmission images between motions of respective steps of said stepwise translations, wherein said respective steps are up to 1 cm and wherein the scanning path(s) comprise at least one straight path length section in a horizontal plan and wherein the image acquisition area has an angle of from 2 degrees to 20 degrees to said path length.

21. A processing method comprising determining at least one property associated to a dry particulate substance, wherein the processing method comprises determining if the at least one determined property fulfil a quality criterion comprising at least one threshold or a threshold range for said at least one property,
wherein the determining of the at least one property associated to the dry particulate substance comprises
providing a portion of the dry particulate substance,
dispersing the dry particulate substance in a portion of a liquid dispersing medium to obtain a dispersed sample comprising the portion of the particulate substance dispersed in the portion of the liquid dispersing medium in a sample support,
performing at least one scanning procedure comprising
acquiring a plurality of light transmission images of an image acquisition area translated along a scanning path through said dispersed sample in said sample support using an image acquisition device having an optical axis and
processing a plurality of the acquired images and determining said at least one property,
wherein said image acquisition area is perpendicular to the optical axis of the image acquisition device,
wherein the acquisition of the plurality of light transmission images of the image acquisition area along said scanning path through said dispersed sample in said sample support, comprises translating said image acquisition area stepwise along the scanning path and acquiring said light transmission images between motions of respective steps of said stepwise translations, wherein said respective steps are up to 1 cm and wherein the scanning path(s) comprise at least one straight path length section in a horizontal plan and wherein the image acquisition area has an angle of from 2 degrees to 20 degrees to said path length.

22. The processing method of claim 21, wherein the processing comprises at least one of the manufacturing processes selected from the group consisting of
manufacturing a product comprising using the dry particulate substance as a raw material,
manufacturing the dry particulate substance as a precursor product or a final product, and
manufacturing the dry particulate substance as a precursor product or a final product.

\* \* \* \* \*